Patented Aug. 9, 1927.

1,638,644

UNITED STATES PATENT OFFICE.

HANS SCHLOSSTEIN, OF CHICAGO, ILLINOIS.

MEDIUM FOR TREATING OILS AND METHOD OF MAKING THE SAME.

No Drawing. Application filed April 21, 1927. Serial No. 185,664.

The present invention relates to mediums for cracking, refining or otherwise treating hydrocarbon oils and coal tar oils; and it has for its object to produce a medium possessing highly advantageous physical and chemical forms for containing a stable hypochlorous salt composition having a large amount of available chlorine.

In carrying out my invention I employ bentonite or other hydrous-alumino-silicate as the base and the vehicle for carrying the chlorine compounds in somewhat the same manner as in my prior application Serial No. 171,082. The present invention may therefore be regarded, in one of its aspects, as having for its object to improve the compound forming the subject matter of the aforesaid application.

In producing my improved medium, I form a jelly by immersing a highly colloidal bentonite clay or other hydrous-aluminosilicate in water. To this jelly-like substance is added a solution of calcium chloride and then a solution of magnesium hydroxide. The compound or mixture of bentonite jelly, calcium chloride and magnesium hydroxide is then treated, usually for a period of somewhat less than an hour, with chlorine gas by any usual or suitable absorption process, the mixture or compound during this treatment being heated to a temperature of from 120° F. to 150° F. The reactions that take place produce in the jelly a hypochlorous compound consisting of magnesium hypochlorite combined with double salts of aluminum and magnesium hypochlorites.

The resulting product is dried by evaporating the moisture at as low a temperature as possible. The resulting product is very stable, being similar to that forming the subject of my aforesaid application, but containing a larger amount of available chlorine than the latter.

When my improved compound is added to the oil before or during the cracking process, the heat of the process liberates the chlorine which then acts as a catalyzer and assists in the cracking operation.

As in the case of the product described in my aforesaid application, the present compound or composition may be used for antiseptic or disinfecting purposes by adding thereto a water soluble acid in powdered form, or some chemical compound that will develop acid upon immersion in water.

I claim:

1. A hydrous-alumino-silicate admixed with calcium chloride, magnesium hydroxide and chlorine.

2. The process of producing an oil treating medium which consists in adding to a hydrous-alumino-silicate jelly calcium chloride and magnesium hydroxide, and treating the mixture with chlorine in the presence of heat.

3. The process of producing an oil treating medium which consists in adding to a hydrous - alumino - silicate jelly calcium chloride and magnesium hydroxide, and treating the mixture with chlorine at a temperature of from 120° F. to 150° F.

In testimony whereof, I sign this specification.

HANS SCHLOSSTEIN.